Patented June 1, 1954

2,680,081

UNITED STATES PATENT OFFICE 2,680,081

SILICATE IMPREGNATION OF POROUS CASTINGS

Leslie E. Probert, William A. Sutton, and Frank Cork, Derby, England, assignors to Rolls-Royce Limited, Derby, England, a British company No Drawing. Application August 27, 1951, Serial No. 243,922

Claims priority, application Great Britain September 14, 1950

1 Claim. (Cl. 117—127)

This invention is for the treatment of metals and particularly castings of aluminium and magnesium base alloy which treatment introduces into the open pores of the metal a filling substance for the purpose of eliminating or substantially reducing the undesirable effects of porosity.

It has previously been proposed to use a sodium silicate solution containing potassium dichromate for impregnating castings. Such a solution is not suitable for use with aluminium because of the presence of an alkali radicle in the silicate solution which would attack the aluminium.

According to this invention the castings are treated with a solution of sodium silicate containing potassium dichromate and also containing chromic acid.

The presence of the chromic acid as we have discovered inhibits the action of the alkali radicle and makes the solution equally suitable for aluminium as for magnesium alloy castings.

The solution is preferably applied in a vacuum autoclave. When the castings are completely covered pressure is applied, the castings are then removed, washed and dried in an oven.

A satisfactory solution can be made up by first adding water to the extent of half the volume of water glass and thoroughly mixing to give a homogeneous solution.

After heating up this solution to between 60° C. and 80° C. another water solution at between 60° C. and 80° C. containing 14% by weight of chromic acid and 10% by weight of potassium dichromate and equal in volume to the water already added to the water glass, is added slowly with constant stirring. A suitable water glass composition is one part $Na_2O$ to two parts $SiO_2$.

Thus the preferred solution will comprise water, chromic acid and potassium dichromate, 50 parts approximately by volume of which:

Chromic acid comprises 7.0 per cent by weight.
Potassium dichromate, 5.0 per cent by weight and the balance water.

Water glass, 50 parts approximately by volume.

Some latitude of the elements in this preferred solution may be permitted, for example as follows: water, chromic acid and potassium dichromate, 45–55 parts by volume, of which:

Chromic acid is 6.5–7.5 per cent by weight.
Potassium dichromate, 4.5–5.5 per cent by weight and the balance is water.

Water glass, 45–55 parts by volume.

It has been found satisfactory to use a solution heated to a temperature of 95 to 100° C. and having a specific gravity at that temperature in the range of 1.45 to 1.5. This range of specific gravity can be maintained by addition of water from time to time as the bath is used since the water tends to evaporate when the bath is heated.

The solution fills up the porosity and on removal of the castings from the solution they are thoroughly washed in cold water and then heated in an air oven to remove all water, thereby leaving in the pores of the metal, sodium silicate compound.

One process in accordance with this specification consists of firstly evacuating the air from the pores in the castings by enclosing the castings in a vacuum autoclave for a period of approximately 30 minutes, to give a vacuum of not less than 25″ Hg, following this, hot sodium silicate solution is allowed to enter the vacuum autoclave and completely cover the castings, when a positive pressure is applied. (A suitable working temperature is from 95° C. to 100° C. and a suitable pressure from 60 lbs. to 80 lbs. per square inch.) The pressure is allowed to remain for approximately 30 minutes and then released when the castings are removed from the solution and autoclave and thoroughly washed in cold water. The castings are then heated in an oven at a temperature of 110° C. to 120° C. for approximately 1 hour.

Instead of using a vacuum autoclave process, impregnation may be carried out by immersing the castings in a hot sodium silicate solution of the type described, maintaining the temperature for ½ hour approximately and then allowing the castings to remain immersed in the solution until cold.

The autoclave method of carrying this process is however recommended for greater impregnation efficiency. The autoclave equipment most suitable for the process is similar to the usual plant required for "Bakelite" (or other related organic material) impregnation. Such a plant would require to have a heating fitment made to the reservoir tank containing the impregnating fluid and preferably also to the autoclave. The plant as a whole would then consist of a vacuum pump connected to the autoclave preferably fitted with a convenient means of heating. The autoclave would be connected to a reservoir tank essentially fitted with a convenient means of heating. Vacuum and pressure gauges must necessarily be fitted to the autoclave. At the end of the vacuum period in the impregnation process, the hot solution contained in the reservoir tank will, by opening the connecting valve between reservoir and autoclave, enter the autoclave until the internal pressure becomes equal to atmospheric pressure. Castings should be so arranged in the autoclave so that the impregnating solution completely covers them when the solution has been transferred to the autoclave.

We claim:

The method of closing up the pores of castings selected from the class consisting of aluminum base alloys and magnesium base alloys by impregnating the same with a solution heated to about 95°–100° C. which is made up to consist of water, chromic acid and potassium dichromate 45 to 55 parts by volume in which the chromic acid content is about 6.5 to 7.5 per cent by weight and in which the potassium dichromate content is about 4.5 to 5.5 per cent by weight; and water glass 45 to 55 parts by volume, the sodium silicate content of which has about one part (by weight) sodium oxide ($Na_2O$) to two parts (by weight) silicon dioxide ($SiO_2$), said solution having a specific gravity of about 1.45–1.5 at the temperature stated.

References Cited in the file of this patent

UNITED STATES PATENTS

| Number | Name | Date |
|---|---|---|
| 944,957 | Eberhard | Dec. 28, 1909 |
| 1,187,746 | Kirchenbauer | June 20, 1916 |
| 1,383,517 | Bezzenberger | July 5, 1921 |
| 2,431,728 | Bergstein | Dec. 2, 1947 |